United States Patent [19]

Klees

[11] 4,294,068
[45] Oct. 13, 1981

[54] SUPERSONIC JET ENGINE AND METHOD OF OPERATING THE SAME

[75] Inventor: Garry W. Klees, Mercer Island, Wash.

[73] Assignee: The Boeing Company, Seattle, Wash.

[21] Appl. No.: 890,364

[22] Filed: Mar. 27, 1978

[51] Int. Cl.³ ............................................... F02K 3/02
[52] U.S. Cl. .................................. 60/204; 60/226 R; 60/262; 60/39.23; 60/39.25
[58] Field of Search .............. 60/39.25, 226 R, 226 A, 60/262, 39.23, 204

[56] References Cited

U.S. PATENT DOCUMENTS

| | | |
|---|---|---|
| 2,458,600 | 1/1949 | Imbert et al. |
| 2,505,660 | 4/1950 | Bauman |
| 2,527,732 | 10/1950 | Imbert |
| 2,630,673 | 3/1953 | Woll |
| 2,858,671 | 11/1958 | Fox ................................. 60/39.25 |
| 3,049,869 | 8/1962 | Grenoble |
| 3,068,644 | 12/1962 | Worsham et al. |
| 3,118,276 | 1/1964 | Keenan et al. |
| 3,161,018 | 12/1964 | Sandre |
| 3,296,800 | 1/1967 | Keenan et al. |
| 3,316,717 | 5/1967 | Castle et al. |
| 3,514,952 | 6/1970 | Schumacher et al. |
| 3,520,138 | 7/1970 | Fox |
| 3,641,766 | 2/1972 | Uehling |
| 3,769,797 | 11/1973 | Stevens |
| 3,792,584 | 2/1974 | Klees |
| 3,797,233 | 3/1974 | Webb et al. ........................... 60/236 |
| 3,841,091 | 10/1974 | Sargisson et al. |
| 3,854,286 | 12/1974 | Klees |
| 3,879,941 | 4/1975 | Sargisson |
| 3,903,690 | 9/1975 | Jones |
| 3,910,375 | 10/1975 | Hache et al. |
| 3,938,328 | 2/1976 | Klees |
| 3,987,621 | 10/1976 | Sabatella et al. |

OTHER PUBLICATIONS

Latimer, R. J., A paper submitted to Agard panel, Paris, Sep. 1976, "Variable Geometry and Multicycle Aero-Engines".
Ramsay, J. W. et al., "Potential Operating Advantages of a Variable Turbine Turbojet", ASME Paper 72-WA/AERO-4, Nov. 1972.
Hourmouziadis, J. et al., "Experience With a One Stage Variable Geometry Turbine", MTU, Germany, date unknown.
May, R. J. et al., "Influence of Variable Turbine Geometry on Engine Installation and Selection", USAF Paper AFAPL-TR-73-18, Nov. 1972.
Sobey, A. J. et al., "Control of Aircraft Powerplants", John Wiley, 1963, pp. 32, 33.

*Primary Examiner*—Robert E. Garrett
*Attorney, Agent, or Firm*—Hughes, Barnard & Cassidy

[57] ABSTRACT

A supersonic jet engine capable not only of developing sufficient power to accelerate up to supersonic cruise and maintain efficient operation at supersonic cruise, but also arrange to cruise at subsonic velocities with a relatively low specific fuel consumption. The engine is provided with a variable bypass passageway downstream of the compressor. Flow into the bypass passageway is controlled so that during low power setting the bypass passageway is closed so that all the gaseous flow is directed through the turbine. During higher power settings, the bypass passageway is opened to the extent that a selected portion of the gaseous flow is directed through the bypass passageway to bypass the turbine, so that the corrected flow to the turbine remains substantially constant for both high and low power settings of the engine.

30 Claims, 11 Drawing Figures

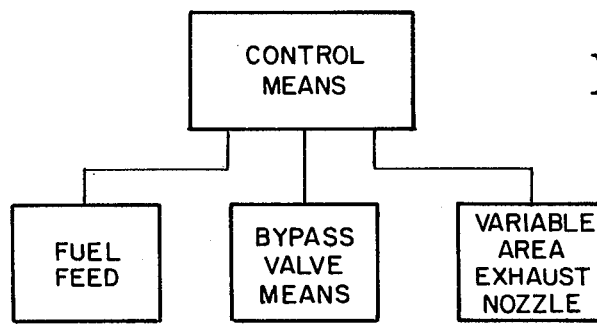
FIG. 5
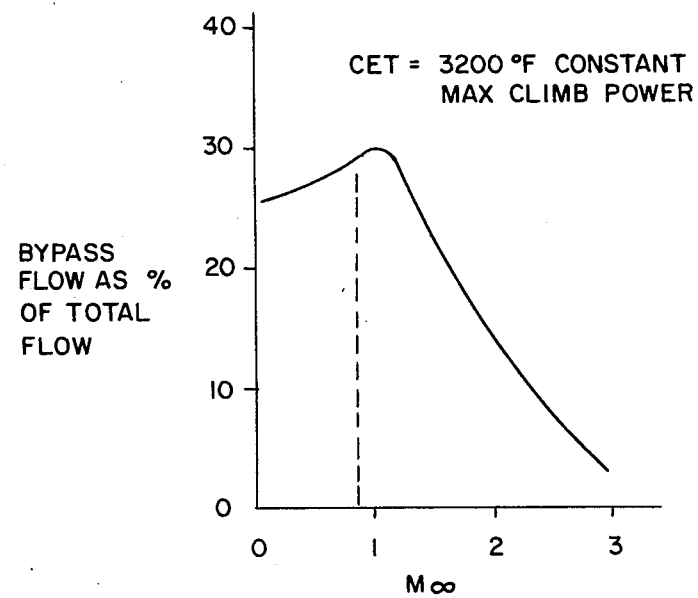
FIG. 6
FIG. 7A
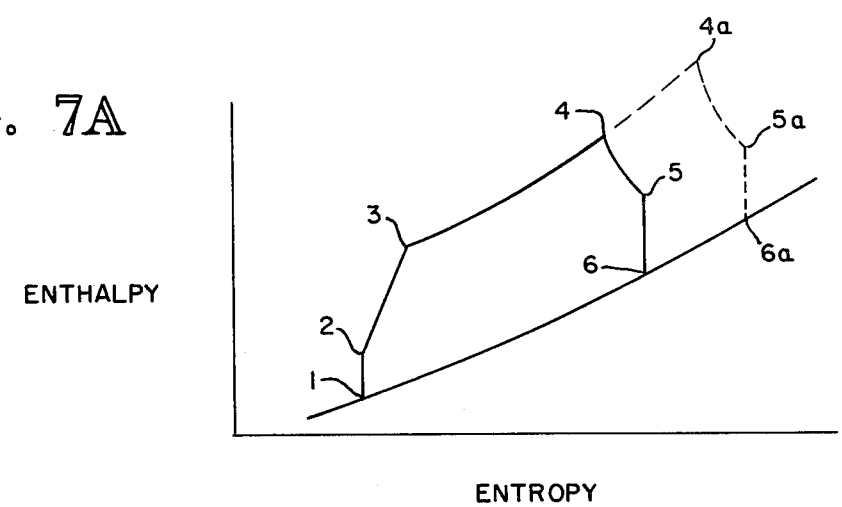

SUPERSONIC JET ENGINE AND METHOD OF OPERATING THE SAME

BACKGROUND OF THE INVENTION

1. Field of the Invention

The present invention relates to a turbojet engine capable of operating effectively at both supersonic and subsonic velocities, and to a method of operating such an engine.

2. Brief Description of the Prior Art

There has long been a requirement for an aircraft which is capable of operating effectively in the supersonic range, and yet have the capability of cruising subsonically with a relatively low specific fuel consumption. With regard to military aircraft, it is necessary that the aircraft be capable of developing very high thrusts for acceleration and operation in the high supersonic range. Yet, for many mission requirements, such as remaining aloft for long periods of time or traveling to and from the areas where the mission is to be carried out, it is desirable that the aircraft be capable of extended subsonic cruise with low specific fuel consumption. With regard to supersonic jet transport, the aircraft must of course be capable of efficient operation at supersonic cruise. However, for extended flight over populated land masses, where the aircraft is required to travel subsonically to avoid the effect of the supersonic boom over such populated areas, the aircraft should also have the capability of operating with low specific fuel consumption.

The problem arises in that when an engine has its operating components matched with one another to operate effectively at high power settings for acceleration and supersonic cruise, the same matching of engine components does not necessarily lend itself for efficient operation at subsonic cruise. At very high thrust settings, the engine necessarily burns fuel at a relatively high rate of consumption and developes combustion exit temperatures in the range of 2800° F. which are forecast for commercial airplanes in the next decade. This necessarily means a relatively high corrected flow through the turbine, and the compressor and turbine must be matched so that the turbine can accept this high corrected flow. However, for subsonic cruise, the rate of fuel consumption should be substantially less, and the combustion exit temperatures should be substantially lower to obtain low specific fuel consumption, possibly in the range of 1700° F. to 1900° F. Under these operating conditions, the engine components which were matched for effective performance at the high power settings with high combustion exit temperatures, are generally not properly matched for efficient operation at the lower power settings of subsonic cruise.

This problem has long been recognized in the prior art, and one possible solution which has been given consideration is the use of a variable area turbine in a supersonic engine. With the variable area turbine, the angle of the stator blades is changed for different operating modes. The blades are moved to a more open position to create a greater turbine nozzle area when the engine is generating greater thrust and thus developing higher combustion exit temperatures, and the stator blades of the turbine area are moved to a more closed position where there is less nozzle area for operation at lower combustion exit temperatures where lower thrust is developed.

This concept of a variable area turbine was analyzed in a paper entitled "Influence of Variable Turbine Geometry of Engine Installation Losses and Cycle Selection", authored by Robert J. May, Jr. and W. F. Zavatkay. This report is designated "AFAPL-TR-73-18" and was presented at a propulsion joint specialists' conference in New Orleans Nov. 27–Dec. 1, 1972. The report concludes that because variable turbine geometry improves the off-design performance, engines incorporating this feature provide good performance over a much broader range of operating conditions. Thus, it is stated in this paper that airplanes designed for a specific mission but incorporating variable turbine geometry engines, will have flexibility to provide good performance for a wide variety of alternate missions.

Three other publications analyzing the variable area turbine concept are the following:

a. "Potential Operating Advantages of a Variable Area Turbine Turbo-Jet", authored by J. W. Ramsay and G. C. Oates, published by the American Society of Mechanical Engineers, United Engineering Center, 345 East 47th St., New York, N.Y. 10017, this publication being contribued for presentation at the Winter Annual Meeting of the Aerospace Division of the American Society of Mechanical Engineers at New York, Nov. 26-30, 1972.

b. A publication entitled "Experience with a One-Stage Variable Geometry Axial Turbine" by J. Hourmouziadis, K. Hagemeister, O. Rademacher and H. Kolben, Motoren-und Turbinen-Union Munchen GmbH, Dachauer Str. 665, 8000 Munchen 50, Germany.

c. a document entitled "A Paper to be Submitted to the AGARD PROPULSION AND ENERGETICS PANEL, 48th, Meeting (Paris) Sept. 6-10, 1976, VARIABLE GEOMETRY AND MULTICYCLE AERO-ENGINES., authored by R. J. Latimer.

While these and other analyses have indicated certain operating advantages by use of the variable area turbine, there are still a number of problems in practical implementation of this concept in a jet engine. First, there is a lower peak efficiency due to vane cooling air profile effect and also due to end wall leakage. Also, there is a significant efficiency reduction when the vane area is opened or closed from the design setting. Further, if there is multiple variable-stage turbines, there are rather severe structural mounting problems, and to the best knowledge of the applicant herein, a total satisfactory solution has not been found to this problem. Thus, while the variable area turbine has been demonstated in a test stand, it is still relatively new technology that would likely require large research and development expenditures to bring it to practical production status.

With regard to the prior art disclosed in the patent literature, a number of prior art patents disclose various applications in turbine engines for devices which have passageways directing air from the compressor to by-pass the turbine. These various devices are not believed to be directly relevant to the basic concept of the present invention, but they are discussed herein as background information on such turbine bypass apparatus.

U.S. Pat. No. 2,527,732, Imbert, disclosed a turbo-prop engine where in a lower power mode air is directed away from the turbine. When there is requirement for a rapid increase in power, the bypass air is directed into turbine to create the additional power in a relatively short period of time.

U.S. Pat. No. 2,630,673, Woll, disclosed a jet engine where air from the compressor is directed through a bypass passageway to provide cooling for a variable area nozzle at the aft end of the engine.

U.S. Pat. No. 3,049,869, Grenoble, directs air from a low-pressure location in the compressor through a bypass passageway to the aft end of the engine. This by-passed air is combined with over-rich exhaust gas to reburn the mixture at a location rearwardly of the turbine in the engine.

U.S. Pat. No. 3,161,018, Sandre, discloses a combined turbojet-ramjet engine where low pressure air is used in conjunction with a bypass turbojet. U.S. Pat. No. 3,296,800, Keenan et al, shows an arrangement somewhat similar to the Sandre patent noted immediately above.

U.S. Pat. No. 3,514,952, Schumacher et al, discloses a variable bypass turbo-fan engine. During subsonic cruise, the air from the fan is directed through the bypass ducts. During supersonic cruise, valve means close off the bypass ducts so that the air is directed through the compressor and thence to the combustion chamber of the engine.

U.S. Pat. No. 3,520,138, Fox, discloses a plurality of power turbines arranged in series with passageways provided around the second and third turbines, and with valves disposed in the passageways to progressively open or close the passageways. The second and third power turbine combinations are connected to thrust-producing devices for vertical takeoff and landing aircraft or some other desired application.

U.S. Pat. No. 3,641,766, Uehling, discloses an engine arrangement where the thrust output of a gas turbine engine is modulated without the necessity of varying the speed of the engine. This device bypasses a portion of the compressor discharge to a manifold which has a plurality of swirl-inducing nozzles which in turn are able to decrease the thrust output of the engine. The intended result is to decrease the delay time between increased thrust demand and actual thrust output while maintaining engine speed.

U.S. Pat. No. 3,879,941, Sargisson, discloses a variable cycle gas turbine engine with a fan having a forward section axially spaced from an aft section. A variable flow bypassing valve is disposed intermediate the forward and aft fan sections in order that air flow between the forward and aft fan sections may be connected either in series flow relationship or in bypassing parallel relation depending upon the desired mode of engine operation. The variable cycle engine also includes a variable flow geometry inlet duct in direct flow connection to the fan for furnishing an inlet airflow to the fan. Within the variable engine cycle is a core engine having a compressor, combuster and turbine in series flow relationship, wherein the compressor receives a portion of the compressed airflow from the fan. A fan turbine section downwstream of the core engine is also provided to drive the fan.

U.S. Pat. No. 3,841,091, Sargisson, et al discloses a jet engine which is inteded to operate efficiently at both subsonic and supersonic speeds. This embodies a variable cycle tandem propulsion system comprising a forward turbo-fan engine having a fan, gas generator, and power turbine arranged in axially serial flow relation. An independent turbojet engine is co-axially displaced downstream of the turbo-fan engine and includes a compressor, combuster and turbine also arranged in axially spaced serial flow relation. An outer exhaust duct is provided for directing the exhaust stream from the turbo-fan engine rearward around the turbojet engine.

There is also included a variable cross over valve means which may be operated in two modes, e.g., subsonic and supersonic. In the subsonic mode, air flow exiting from the fan which by-passes around the gas generator is directed to the outer exhaust duct means while at the same time a separate inlet ambient air flow stream is directed to the inlet of the turbojet. In its supersonic mode, air flow existing from the fan which by-passes around the gas generator is directed to the turbojet inlet, thereby supercharging the inlet airflow to the turbojet.

U.S. Pat. No. 3,068,644, Worsham et al, relates primarily to a particular type of nozzle wherein shroud flaps are used to control the configuration of a secondary nozzle through which secondary air is directed.

U.S. Pat. No. 3,769,797, Stevens, discloses an engine configuration where bypass flow of an engine is used for vertical takeoff and landing mode of operation.

These following patents relate to an air-breathing gas turbine engine where there is valving means for controlling the airflow to "cross over" or be inverted as it passes through the engine: U.S. Pat. Nos. 3,792,584, Klees; 3,854,826, Klees; and 3,938,328, Klees.

The following patents are noted as being generally representative of the state of the art with regard to jet engines in general.

U.S. Pat. No. 2,458,600, Imbert et al, shows an arrangement of a turbo-fan engine.

U.S. Pat. No. 2,505,660, Baumann, discloses a thrust "augmentor" comprising in combination at least two coaxial contrarotationally bladed turbine rotors adapted to be driven by a flow of high velocity combustive gas.

U.S. Pat. No. 3,118,276, Keenen et al, discloses a turbo-fan engine where the fan air communicates with the exhaust gas duct downstream of the turbine or turbines through one or more mixing chutes which extend into the exhaust gas duct.

U.S. Pat. No. 3,316,717, Castle et al, discloses a turbofan engine having a variable bypass ratio. This is accomplished by placing fans fore and aft of the gas turbine unit. The fans operate in series for a low bypass ratio, or in parallel for a high bypass ratio.

U.S. Pat. No. 3,903,690, Jones, discloses a turbo-fan engine where all of the bladed stages of the turbine and substantially all of the compressor blades are rotor stages.

U.S. Pat. No. 3,910,375, Hache et al, discloses a jet engine silencer where there is a jet nozzle, and means are provided to inject air into the flow stream emitted from the jet nozzle.

U.S. Pat. No. 3,987,621, Sabatella, Jr. et al, simply discloses a turbo-fan engine where the inner stream includes no noise suppression and the jet exhaust noise generated at take-off is reduced by mechanically suppressing the jet exhaust noise of the outer stream.

SUMMARY OF THE INVENTION

The supersonic jet engine of the present invention is adapted to cruise at supersonic speeds at a relatively high efficiency with turbine inlet temperatures of at least 2500° F. and up to as high as 3200° F., and also to cruise subsonically with a relatively low specific fuel consumption at substantially lower turbine inlet temperatures in the order of 1700° F. to 1900° F. Yet this engine has the capability of developing sufficient thrust in both the subsonic and supersonic range to accelerate at an adequate rate through both the subsonic and supersonic ranges to supersonic cruise velocity.

This engine comprises a housing structure having an upstream inlet end to receive intake air and a downstream exhaust end to discharge jet exhaust. The air inlet is or may be of conventional design, and is arranged to receive intake air at subsonic velocity, and also to receive intake air at supersonic velocity and reduce said air in the inlet to subsonic velocity.

A compressor is mounted in said housing rearwardly of said inlet, and is arranged to compress air flowing into the inlet in a range between a maximum compression ratio and a minimum compression ratio. Rearwardly of the compressor is a combustion chamber which receives compressed air from the compressor, and fuel injection and ignition means in the combustion chamber is arranged to combust fuel in the airflow from the compressor and provide a gaseous flow from the combustion chamber.

A turbine is mounted in the housing rearwardly of the combustion chamber, this turbine being designed to receive the gaseous flow from the combustion chamber at temperatures at least as high as about 2500° F., and also to receive the gaseous flow at lower temperatures in the range of 1700° F. to 1900° F. The turbine is operatively connected to the compressor to drive the compressor, and the turbine has a predetermined substantially constant cross-sectional nozzle area through which said gaseous flow passes. The gaseous flow from the turbine then passes through a variable area exhaust nozzle to produce thrust.

Turbine bypass means is provided to receive gaseous flow from a location downstream of the compressor as bypass flow, and to direct the bypass flow along a path bypassing the turbine and exhaust the bypass flow from the engine in a manner to produce additional thrust. To control the amount of bypass flow into the turbine bypass means, there is provided a bypass valve means.

The engine further has engine control means operatively connected to the fuel injection and ignition means, to the bypass valve means and to the exit nozzle, in a manner to control the amount of fuel directed to the fuel and ignition means, to control the amount of bypass flow flowing into the bypass means, and to control the area of the exhaust nozzle.

Of particular significance in the present invention is the manner in which the turbine is matched to the compressor. This matching is such that with the engine operating at subsonic cruise velocity, with the compressor operating at maximum or near maximum compression ratio, with said bypass valve means positioned so that there is substantially no bypass flow through said turbine bypass means, and with fuel flow being adequate to create thrust sufficient to match airplane drag at subsonic cruise, the turbine has a nozzle area sized to permit gaseous flow therethrough at the speed of sound in said gaseous flow.

The engine control means is arranged to set the bypass valve means at a more open position at higher engine thrust settings where higher temperatures are created in the combustion chamber and to set the bypass valve means at a more closed position at lower engine thrust settings where lower temperatures are created in said combustion chamber, in a manner that total corrected flow through the engine is subject to variation, and there is a substantially constant corrected gaseous flow into the turbine, this corrected flow being calculated according to the formula:

$$(W\sqrt{\theta+})/A\delta+ = \text{constant, when nozzle is choked}$$

where:
- W = Total mass flow rate in lbs. per second
- $\theta+$ = Observed temperature (absolute) divided by standard temperature (518.67° R.)
- $\delta+$ = Observed pressure divided by standard pressure (2116.22 lbs./sq. ft.)
- A = Turbine nozzle area.

The effect of this is that during subsonic cruise the engine can operate at a relatively low specific fuel consumption with high compression ratio and lower combustion exit temperature, in a condition with the valve bypass means at a substantially closed position. During the high power acceleration mode, the engine can operate at higher combustion exit temperatures in a condition with the valve bypass means in a more open position to maintain constant corrected flow through the turbine to satisfy the turbine requirements. A conventional turbojet without the bypass means could not accept the increased corrected flow and would therefore be limited in temperature and thrust substantially equal to the cruise temperature and thrust.

According to the principles of gas-dynamics, the nozzle area of the turbine should be sized to satisfy the following formula, under conditions of subsonic cruise, where the compressor is operating at maxiumum or near maximum compression ratio and the $$(W\sqrt{\theta+})/\delta+ = \text{nozzle area}$$

where:
- W = Total mass flow rate in lbs. per second
- $\theta+$ = Observed temperature (absolute) divided by standard temperature (518.67° R.)
- $\delta+$ = Observed pressure divided by standard pressure (2116.22 lbs/sq. ft.)

In a first embodiment of the present invention, a flow splitter is positioned forward of the fuel injection and ignition means, to direct bypass air from the discharge end of the compressor into a bypass passageway located radially outwardly of the combustion chamber. At the aft end of the bypass passageway, there is provided a variable area turbine bypass nozzle which functions as the valve means to control flow through the bypass passageway. Thus, the bypass air is directed rearwardly in a pattern which is generally coannular and radially outward from the main gaseous discharge through the primary exhaust nozzle.

There is a second embodiment similar to the first embodiment, except that an afterburner is placed at a location downstream of the turbine. A cooling liner surrounds the area downstream of the afterburner, and a portion of the bypass air may pass through this cooling liner to provide adequate cooling around the area of the afterburner.

In a third embodiment, the entrance to the bypass passageway is located downstream of the combustion chamber so that the bypass flow is the gaseous flow from the combustion chamber. A control valve is located at the entrance of the bypass passageway to control flow therethrough.

In a fourth embodiment, the bypass passageway is provided as a plurality of longitudinally extending tubes, positioned in a circumferential pattern around the combustion chamber and the turbine. The forward inlet ends of the tubes communicate with the airstream immediately downstream of the compressor, and the outlet ends of the tube lead into the main exhaust passageway just downstream of the turbine. Valve means are provided at the exit ends of the tubes to control bypass flow therethrough.

In the method of the present invention, there is first provided an engine having the same arrangement of engine components as that described above. This engine is operated in a manner that the bypass valve means is selectively moved between its open and closed positions as a function of burner temperature to control flow through the turbine to maintain a substantially constant flow to the turbine, which flow is calculated according to the formula given earlier herein. More specifically, when the engine is being operated at higher power settings where there are higher combustion exit temperatures, the bypass valve means is open to a greater extent to provide a smaller mass flow, yet constant corrected flow to the turbine. At lower power settings where there is lower burner temperature, as for subsonic cruise, the valve bypass means is moved to a substantially closed position, so that substantially the entire air flow passing through the compressor is directed through the turbine to provide a larger mass flow, and get constant corrected flow to the turbine.

Other features of the present invention will become apparent from the following detailed description.

BRIEF DESCRIPTION OF THE DRAWINGS

FIG. 5 is a schematic illustration of the control means for the present invention;

FIG. 6 is a graph where engine bypass ratio is plotted against Mach number to illustrate the operating characteristics of the present invention;

FIGS. 7A and 7B are enthalpy-entropy diagrams illustrating operating characteristics of the present invention at low power and high power settings;

DESCRIPTION OF THE PREFERRED EMBODIMENTS

Figure 1:
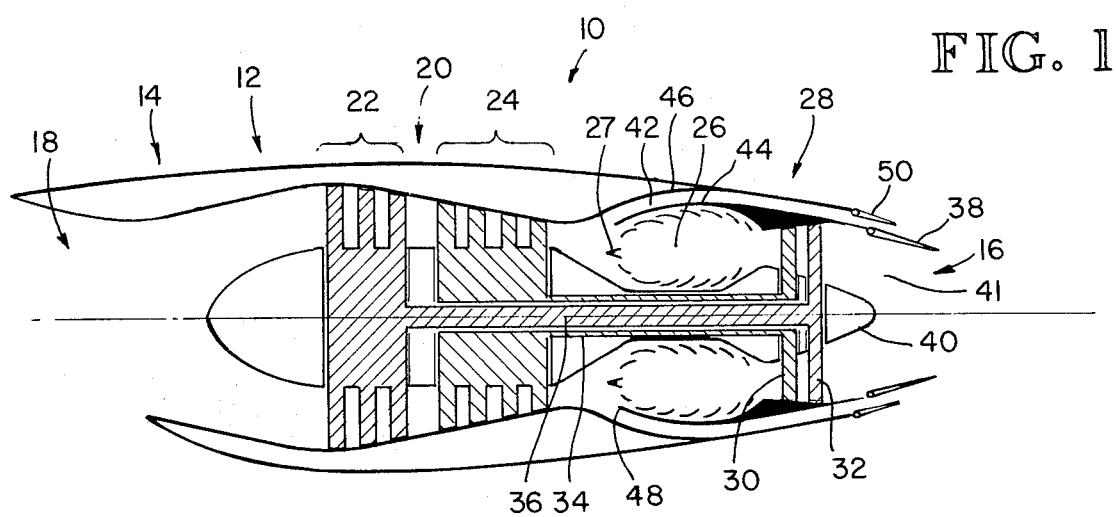
FIG. 1 is a longitudinal semi-schematic view of a first embodiment of a jet turbine engine of the present invention.

In FIG. 1 there is a schematic showing of a first embodiment of the present invention. The engine 10 comprises a housing 12 having a forward inlet end 14 and an aft exhaust end 16. At the inlet end 14 there is a supersonic inlet 18 which is or may be of conventional design, such as a variable geometry inlet. At supersonic speeds, this inlet functions to receive air at supersonic velocity, and reduce the velocity of air in the inlet to subsonic velocity.

Immediately aft of the inlet is a compressor 20. In this particular embodiment, this is a two-spool compressor, made up of a forward low pressure compressor section 22 and a rear high pressure compressor section 24. Immediately downstream of the compressor 20 the housing 12 defines a combustion chamber 26 in which is mounted a fuel injection and igniting device, indicated schematically at 27. Downstream of the fuel injection and igniting device 27 is a turbine 28, made up of a first high pressure stage 30 and a second low pressure stage 32. The high pressure stage 30 is operatively connected to the high pressure compressor section 24 through an outer shaft indicated at 34, and the low pressure stage 32 is operatively connected through an inner shaft, indicated at 36, to the low pressure compressor section 22. Downstream of the turbine 28 is a primary variable area exhaust nozzle 38, defining with a tail cone 40 a primary exhaust passageway 41 through which the primary exhaust is discharged.

At a location surrounding the combustion chamber 26 and immediately downstream of the compressor section 20, there is a turbine bypass passageway 42. In the schematic illustration of FIG. 1, this passageway 42 is shown as an annular passageway defined by inner and outer concentric walls 44 and 46, respectively. However, it is to be understood that this passageway could be formed in some other way, such as a plurality of passageways defined by individual tubes, as shown in the fourth embodiment herein. The forward end 48 of the inner wall 44 functions as a splitter to divide the air flow from the second compressor stage 24 into a main flow path which goes into the combustion chamber 26, and a bypass flow path which is through the bypass passageway 42. Flow through the bypass passageway 42 is controlled by a variable area bypass nozzle member 50 at the discharge end of the passageway 42. This nozzle member 50 can be closed down to completely shut off flow through the bypass passageway 42, or it can be moved to a full open position to permit maximum design flow through the bypass passageway 42.

Of particular significance in the present invention is the matching of the main components of the present invention, and in particular the matching of the compressor 20 with the turbine 28. Let it be assumed that the engine 10 is mounted to an aircraft which is operating at subsonic cruise (i.e., traveling at a Mach number between 0.8 and 0.95). In this subsonic cruise mode, the compressor 20 is designed to operate at maximum design compression ratio and the engine 10 is developing adequate thrust to match total drag on the aircraft (or in the case where there are multiple engines 10, to develop its proportionate share of thrust so that the several engines 10 develop sufficient thrust to overcome total subsonic drag).

In this condition, the bypass nozzle member 50 is moved to its full closed condition so that the entire flow of air from the turbine 20 is directed through the combustion chamber 26 to the turbine 28. Also, the amount of fuel that is delivered to the fuel injection and ignition device 27 is just sufficient so that the desired thrust for subsonic cruise is developed. Under these operating conditions, it is expected that the combustion exit temperature of the gases leaving the combustion chamber 26 are between approximately 1500° F. to 1700° F. Under these operating conditions, the turbine 28 is designed to have a nozzle area of a size that the gaseous flow through the first stage of the turbine is at the speed of sound.

To appreciate the significance of this matching of the compressor 20 and the turbine 28 for subsonic cruise, it should be indicated that as a general proposition, when the compressor is operating at a maximum compression ratio and maximum mass flow rate, a jet engine is able to produce the same thrust for a lower fuel consumption. Thus, with the compressor 20 and the turbine 28 being matched so that the compressor 20 is operating at maximum compression ratio and mass flow at subsonic cruise, and with all of the flow from the compressor being directed through the turbine 28, the engine 10 is able to operate at a relatively low specific fuel consumption at subsonic cruise.

Let use now consider the operating condition of the engine 10 of FIG. 1 operating at subsonic speeds and developing thrust greater than total drag so that the aircraft to which the engine 10 is mounted is in an accelerating mode of operation.

It is to be understood that since the angles of the blades in the turbine 28 are fixed, for the turbine 28 to function properly, the correct flow through the turbine should be substantially constant. Corrected flow through the turbine is calculated according to the following formula:

$$(W\sqrt{\theta+})/\delta+ = \text{corrected flow}$$

where:
W = Total mass flow rate in lbs. per second
$\theta$ = Observed temperature (absolute) divider by standard temperature (518.67° R)
$\delta+$ = Observed pressure divided by standard pressure (2116.22 lbs.sq. ft.)

With the aircraft to which the engine 10 is mounted in an accelerating mode in the subsonic velocity range, fuel is fed to the engine 10 at its maximum rate to obtain maximum thrust, and this in turn results in higher temperatures being developed in the combustion chamber 26. As indicated above, in the formula for corrected flow, for the same amount of mass flow at the same pressure, the corrected flow increases at a rate proportional to the square root of the temperature. Thus the corrected flow from the combustion chamber 26 would be expected to increase with an increase in combustion exit temperature. To maintain corrected flow through the turbine 28 constant, the turbine bypass nozzle 50 is moved toward an open position so that a portion of the airflow from the compressor 20 flows through the turbine bypass passageway 42 and out the nozzle 50.

With the foregoing in mind, let us now analyze the operating characteristics of the engine 10 and the aircraft to which it is mounted when taking off from the ground, accelerating upwardly through both the subsonic and supersonic range, and finally arriving at supersonic cruise velocity. Reference is made to FIG. 6, which is a graph plotting the percentage of air which flows through the bypass passageway 42 against the Mach number at which the aircraft to which the engine 10 is mounted is cruising. In plotting this graph, the following assumptions are made.

(1) Maximum temperature is used throughout climb.
(2) The turbine area is selected and optimized to give:
    (a) good subsonic specific fuel consumption,
    (b) little or no bypass at supersonic cruise.
(3) The airplane is designed for Mach 3 cruise.
(4) The overall pressure ratio is selected to give adequately low compressor exit temperature for turbine and disc cooling at Mach 3.

It can be seen that at take-off, considerable thrust is needed, so the engine 10 is set at a moderately high power setting. As the aircraft is accelerating through the subsonic velocity range, the percentage of bypass flow increases to a maximum at or about the Mach 1 level, where near maximum power is needed to move the aircraft through the transonic range.

As the aircraft continues accelerating through the supersonic range, the engine 10 is still at a relatively high power setting and developing a relatively high amount of thrust. However, as the aircraft velocity increases, the ram pressure of the air moving into the engine inlet 18 increases at a relatively high rate. Since the corrected airflow to the turbine 28 decreases in proportion to the increase in pressure, the net effect is that to maintain corrected flow through the turbine 28 constant, the percentage of bypass flow is decreased as the aircraft accelerates from Mach 1 to Mach 3. When the aircraft reaches Mach 3, it is operating at supersonic cruise velocity, and the bypass air has been substantially closed down to a rate of about 5% or possibly down to zero. This bypass air can be directed through the aft section of the engine to provide cooling around the exhaust passageway 41.

Let it now be assumed that it is no longer desired to operate the aircraft at supersonic cruise and it is desired to return to subsonic cruise. In a military aircraft, this would occur when the mission has been completed and the aircraft must travel a relatively long distance back to its base. In a commercial aircraft, this situation would occur, for example, when the aircraft is beginning its course of travel over a populated land mass where supersonic cruise is unacceptable.

In this situation, less fuel is delivered to the engine 10 so that the combustion exit temperatures decrease, and the corrected flow to the turbine 28 would likewise decrease. Therefore, to maintain the corrected flow to the turbine substantially constant, the bypass nozzle member 50 is moved further toward its closed condition to direct a greater percentage of the total flow through the turbine. When the aircraft is operating at subsonic cruise, the percentage of bypass flow has decreased to zero. At this point, the engine 10 is operating in the condition first described above, where the compressor 20 is operating at maximum compression ratio and mass flow, and the turbine 28 is sized to accept all this flow to satisfy the turbine requirements.

Figure 7B:
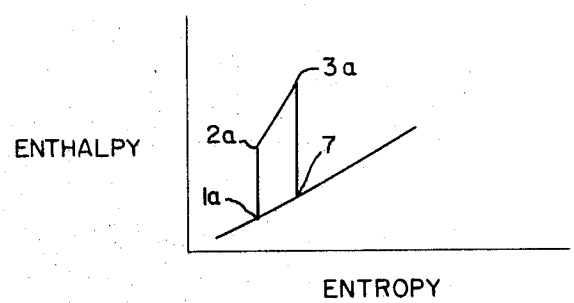

Reference is made now to FIGS. 7A and 7B, in which the operating characteristics of the engine of the present invention are disclosed where enthalpy is plotted against entropy. FIG. 7A represents the condition where there is no engine bypass flow and maximum bypass flow, and FIG. 7B discloses the effect of the bypass air during high power operation where air is being bypassed during subsonic acceleration.

The solid lines in FIG. 7A represent operating characteristics at subsonic cruise, and the dotted lines indicate the operating characteristics at higher power settings during subsonic acceleration. With reference to FIG. 7A, the line segment from point 1 to point 2 indicates the rise in both pressure and temperature of the air passing into the inlet. The line segment from point 2 to point 3 represents the temperature and pressure rise of the air flowing through the compressor. The line segment from point 3 to point 4 represents the increase in temperature of the air flowing through the combustion chamber, with point 4 representing the pressure and temperature at the face of the turbine at subsonic cruise. At subsonic cruise, the temperature is assumed to be at about 1700° F., the bypass valve means is closed, and the total gaseous flow is directed through the turbine.

The line segment from point 4 to point 5 represents the temperature and pressure drop of the gaseous flow through the turbine, and the line segment from point 5 to point 6 represents the thrust developed by the gaseous flow out the exhaust nozzle.

With further reference to FIG. 7A, let it be assumed that the engine is now operated at a higher power setting, as during subsonic acceleration. The line segments from points 1 to 2 and from points 2 to 3 would be nearly the same as for subsonic cruise, since flow through the compressor is substantially the same. However, since a greater amount of fuel is being directed into the combustion chamber, combustion exit temperatures are higher, and the line segment from point 3 to point 4a indicates the rise in temperature taking place in the combustion chamber. The line segment from point 4a to point 5a represents the gaseous flow through the turbine, and the line segment from point 5a to point 6a represents the thrust developed by the gaseous flow from the turbine.

It should be indicated that in this operating condition since only a portion of the total gaseous flow is directed through the turbine, there is a greater pressure and temperature drop (from point 4a to point 5a) than there would be if it were possible to direct all of the gaseous flow through the turbine. However, the air which is bypassed around the turbine is also used to produce a thrust, and this is represented in FIG. 7B. The line segment from point 1a to point 2a represents the flow of air through the inlet, and the line segment from point 2a to point 3a represents the flow of air through the compressor. The line segment from point 3a to point 7 represents the flow of bypass air as it is being exhausted to create additional thrust. Thus, it can be recognized that during the high power setting of the engine where a certain portion of the flow is bypass flow, the thrust developed by the gaseous flow exiting from the turbine is decreased from what such thrust would be if it were possible to direct the total flow through the turbine. This is offset to some degree by the additional thrust developed by exhausting the bypass air in a manner to create thrust. However, it should also be recognized (as illustrated in the full line showing of FIG. 7A where the conditions during subsonic cruise are illustrated that the engine is capable of functioning very effectively at subsonic cruise with a relatively low specific fuel consumption, while still having the capability (as illustrated in the dotted lines of FIG. 7A) of developing adequate thrust at higher combustion temperatures for acceleration through subsonic and supersonic range up to supersonic cruise.

Figure 2:
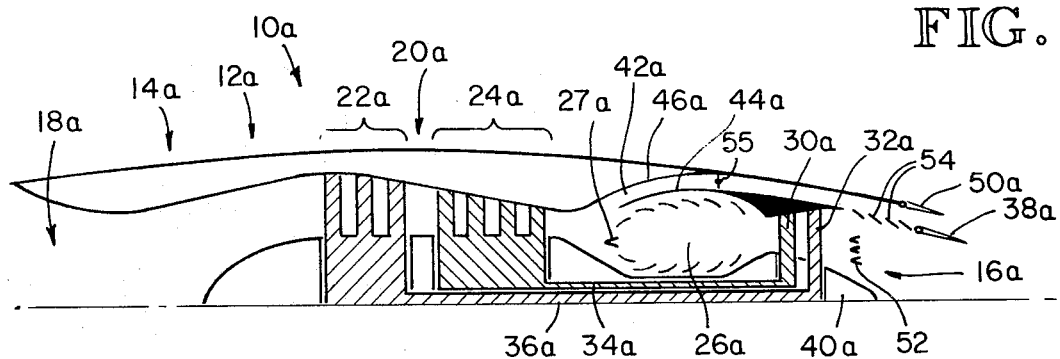
FIG. 2 is a view similar to FIG. 1 showing a second embodiment thereof.

A second embodiment of the present invention is shown in FIG. 2. Components of the second embodiments which are similar to the first embodiment will be given like numerical designations, with an "a" suffix distinguishing those of the second embodiment. It can be seen that the engine 10a of FIG. 2 comprises a forward compressor 20a comprising first and second compressor sections 22a and 24a, and a two stage turbine 28a comprising high pressure and lower pressure turbine stages 30a and 32a. There is a combustion chamber 26a and a fuel injecting and igniting device 27a position rearwardly of the first and second compressor sections 22a and 24a.

This second embodiment differs from the first embodiment in that an afterburner 52 is positioned downstream of the turbine 28a, and this afterburner 52 injects fuel into the gaseous flow emitted from the turbine 28a to combust with the excess air in the gaseous flow. The aft portion of the housing wall 44a is provided with a plurality of slot-like openings 54 through which a portion of the bypass air can flow to provide cooling for the wall 44a, and a valve, indicated schematically at 55, is provided in the passageway 42a to control by-pass flow.

The operation of the jet engine 10a of the second embodiment is substantially the same as that of the engine 10 of the first embodiment in that during subsonic cruise the bypass control nozzle 50a is closed, and the slotted openings 54 are also closed to shut off flow through the bypass passageway 42a. When the engine 10a is developing higher thrust, the turbine bypass nozzle member 50a is opened, in the manner described with respect to the first embodiment to maintain corrected gaseous flow through the turbine 28a constant. If yet additional thrust is required, the afterburner 52 is actuated to inject fuel into the gaseous flow from the turbine 28a, and the openings 54 in the rear section of the housing wall 44 are opened to provide cooling air flow around the gaseous flow from the afterburner 52.

Figure 3:
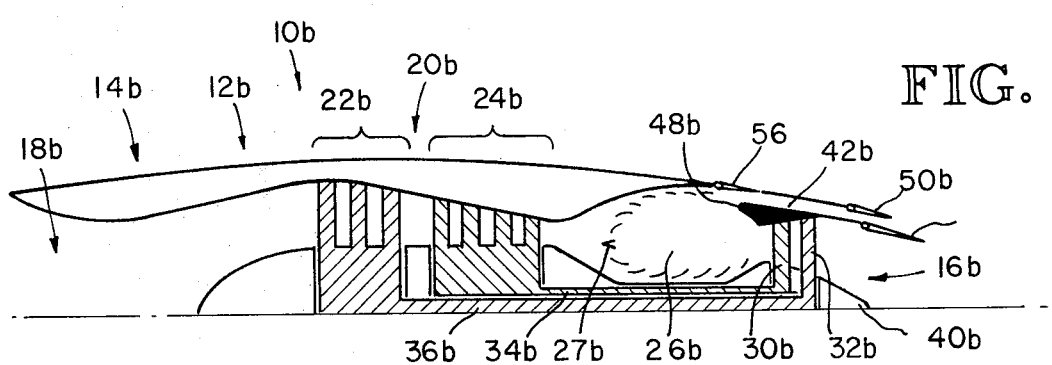
FIG. 3 is a semi-schematic view similar to FIGS. 1 and 2 showing yet a third embodiment.

FIG. 3 shows a third embodiment. Components of this third embodiment which are similar to components of the first two embodiments will be given like numerical designations, with a "b" suffix distinguishing those of the third embodiment.

The main components of this third embodiment are quite similar to those of the first two embodiments, and so these will not be repeated in this description of the third embodiment. The essential difference in this third embodiment is that the splitter 48b is positioned rearwardly of the combustion chamber 26b so that the turbine bypass passageway 42b receives gaseous flow which is a mixture of combustion gases and air. In addition to the bypass nozzle member 50b, there is a forward valve member 56 which is able to completely shut off the gaseous flow into the turbine bypass passageway 42b. During low power operation where bypass flow into the passageway 42b is not desired, this valve 56, in the form of a flapper door, is entirely closed to direct the entire gaseous flow from the combustion chamber 26b into the turbine 28b. The arrangement in FIG. 3 has the benefit of increasing the thrust of the engine at its higher power settings. However, as an offsetting factor, it adds more complications to what is otherwise a relatively simple engine.

Figure 4:
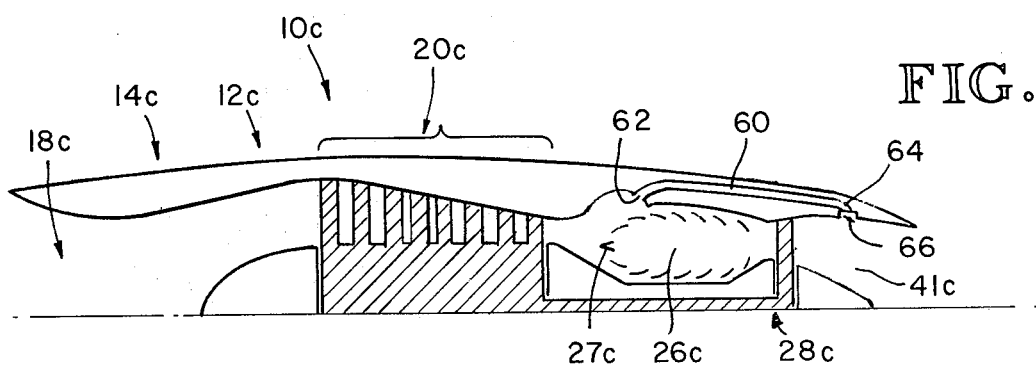
FIG. 4 is a semi-schematic view similar to FIGS. 1 through 3 showing yet a fourth embodiment.

FIG. 4 shows a fourth embodiment of the present invention. This fourth embodiment is presently believed by the applicant to be the preferred embodiment of the four embodiments shown herein. Components of this fourth embodiment which are similar to components of the first three embodiments will be given like numerical designations with a "c" suffix distinguishing those of the fourth embodiment. This fourth embodiment differs from the previous three embodiments in that instead of illustrating an annular bypass passageway, the bypass passageway is provided by a plurality of tubular bypass members. Also, the bypass air from the compressor is directed into the gaseous flow from the turbine so that the total gaseous flow is through the main exhaust passageway.

Thus, it can be seen that the engine 10c comprises a forward compressor 20c and a rear turbine 28c. In this particular embodiment, the compressor 20c is shown as a single spool compressor, and the turbine 28c is shown as a single stage turbine. However, it is to be recognized that as illustrated in the previous embodiments, the compressor 20c could also be made as a two spool compressor, and the turbine 28c could be made as a two stage turbine, with the two stages being operatively connected to related compressor spools.

As shown in FIG. 4, there are a plurality of longitudinally extending bypass tubes 60, arranged in a circumferential pattern around the fuel injection and igniting device 27c and around the turbine 28c. In the schematic showing herein, only one tube 60 is shown, it being understood that there is a plurality of such tubes 60.

Figure 9:
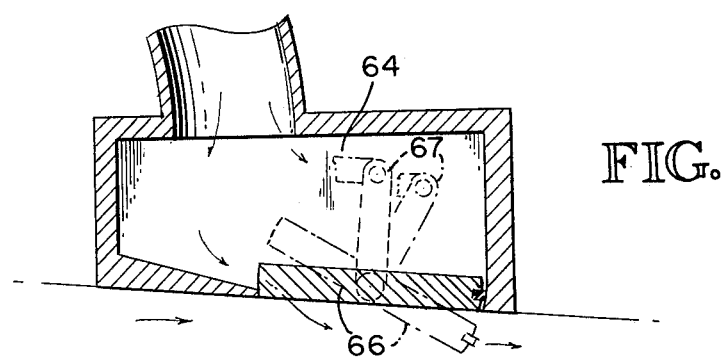
FIG. 9 illustrates one of the by-pass valves employed in the fourth embodiment.

Each tube 60 has a forward entrance portion 62 located immediately downstream of the compressor 20c, and a rear exit end 64 leading into the main discharge passageway 41c downstream of the turbine 28c. To control flow through each of the bypass tubes 60, there is provided at each exit end 64 a related bypass valve 66, shown in FIG. 9. Each valve 66 is moved between its open and closed position by an associated actuating link 67. The mode of operation of the jet engine 10c can be readily understood from the afore described mode of operation of the previous three embodiments, so it will not be repeated herein.

In FIG. 5, there is a schematic illustration of the control means of the present invention. It can be seen that the control means is operatively connected to (a) the fuel feed, (b) bypass valve means, and (c) variable area exhaust nozzle, so as to control the settings of all three components. The control means is itself made responsive to the appropriate operating characteristics of the engine. Since the manner in which this is done is well known in the prior art, they will be mentioned briefly herein. Specifically, the control means could be made responsive to the revolutions per minute of the engine, the power setting of the engine, the engine pressure ratio, the exhaust gas temperature, the compressor pressure ratio, and the inlet total temperature. As indicated previously herein, the control means would respond to these various inputs to insure that the bypass valve means is at the proper setting to insure that there is constant corrected flow to the turbine.

A particularly interesting facet of the present invention is that certain advantages are achieved when it is employed with a multiple stage turbine and a multiple section compressor, as in the first embodiment.

The full explanation as to why this phenomenon occurs depends upon some rather complex analyses of engine performance, and these are well beyond the scope of this presentation of the present invention. However, as a very rough generalization, it can be said that these benefits occur in the present invention for the reason that since variations in combustion exit temperature which tend to alter corrected gas flow to the turbine are compensated for by bypassing some of the gaseous flow to the turbine, the two stages of the turbine are able to function in a relatively narrow operating range over a relatively wide range of engine power settings. Likewise, the two compressor sections are able to function in a relatively constant operating range over a wide range of engine power settings. The net effect is that it is possible to optimize engine performance within these relatively narrow ranges of operation, even though there is a wide range of power settings.

To appreciate this particular feature, let us first examine the operating characteristics of the prior art variable area turbine concept with regard to an engine having a multiple stage turbine and a two spool compressor. First, with regard to the prior art variable area turbine concept, the stator blades must be able to be rotated about their axial length from a full open position when corrected flow is greatest, and to a more closed position when corrected flow is at a minimum. To minimize operating losses at the operating extremes, the turbine is generally designed for peak operating efficiency with the blades angled at some intermediate position, with the turbine operating less efficiently at its two extreme positions.

With a two-stage variable area turbine operating at a high power setting, the blades of the first stage turbine are set at a full open position to accommodate the higher corrected flow from the combustion chamber. In this operating condition, the pressure drop and temperature drop of the gaseous flow through the turbine first stage is of a relatively smaller magnitude. Since corrected gas flow is inversely proportional to the pressure of the gas and directly proportional to the square root of the temperature, it can be seen that at this particular setting of the first stage of the turbine, the corrected flow of the gas exiting from the first stage of the turbine has not increased as greatly as it would have if the turbine first stage were operating at a setting where there was a greater pressure and temperature drop across the turbine first stage.

The effect of this is that the second turbine stage receives gaseous flow from the first turbine stage at a relatively low corrected flow. Accordingly, the blades of the second turbine stage must be moved more toward a closed position to satisfy the requirements of the turbine second stage.

To examine further the operating characteristics of the prior art variable area turbine, let it be assumed that this same engine is operating at a lower power setting where corrected flow from the combustion chamber is at a lower level. In this condition, the blades of the turbine first stage are rotated to a more closed position where there is less nozzle area, and in this position there is a relatively greater drop in both pressure and temperature of the gaseous flow through the turbine first stage. Lower working temperature in the turbine reduces the work capacity of a given mass flow. Therefore a greater temperature drop and pressure drop must be taken in the turbine to accomplish the same work. This results in relatively greater corrected flow from the outlet end of the turbine first stage. To accommodate this relative increase in corrected flow, the blades of the second stage of the turbine are moved toward a more open position.

Thus to achieve a given pressure and temperature drop across the entire turbine, at the high and low power settings the two stages are in a sense operating against one another. At the high power setting the first stage moves more toward an open position to move the second stage to a more closed position. The opposite occurs at a low power setting. It is only at the intermediate power settings that both turbine stages of the variable area turbine are operating at optimum design position.

To apply a similar analysis to the present invention, where there is a two-stage turbine and two-spool compressor, maintaining corrected gas flow to the turbine first stages is accomplished by controlling the amount of turbine bypass flow. Thus, even though there are rather large changes in combustion exit temperature because of the change in the engine power setting, the turbine first stage receives substantially the same corrected gas flow and is thus operating within a relatively narrow range of operating conditions. With regard to the turbine second stage, it likewise benefits from this situation since there is relatively less variation in the corrected flow through the turbine first stage, and the turbine second stage is able to operate within a relatively narrow range of operating conditions. Since there is relatively less variation in the operation of the two turbine stages (in comparison with the variable area turbine engine), the two compressor spools, being driven by the two turbine stages, experience less variation in their operating characteristics. Thus under a wide range of power settings the two stages of the turbine and the two stages of the compressor are able to operate relatively close to their optimum design operating conditions.

It is to be recognized that the above is a vastly oversimplified explanation of rather complex analyses of engine performance. However, this explanation is presented to give at least some insight into the particular advantages of incorporating the present invention in a multiple stage engine.

A comparison of the operating characteristics of the present invention, as applied to a supersonic engine having a two spool compressor and two stage turbine, was made with respect to a comparable engine employing the variable area turbine concept also having the two spool compressor and two stage turbine. This comparison was made by analyzing the corrected flow through each engine at five different locations, indicated in the sketch accompanying FIGS. 8A and 8B, these being as follows:

a. a location immediately upstream of the compressor (indicated at "A")
b. a location immediately downstream of the compressor and upstream of the combustion chamber (indicated at "b")
c. a location at the upstream face of the turbine first stage (indicated at "C")
d. a location between the turbine first stage and turbine second stage (indicated at "D")
e. a location immediately downstream of the turbine second stage (indicated at "E").

The corrected air flow at these various locations was determined for operation at Mach 0.9, at 36,089 feet, with combustion exit temperatures ranging from approximately 1200° F. to approximately 1700° F. To provide a base line for determining increase or decrease of corrected flow at varying combustion exit temperatures, the corrected air flow at approximately 3200° F. was determined at each location for each engine, and these values were plotted at the middle base line which is at the zero level with respect to the vertical axis of the two graphs along which percentage change in corrected air flow is plotted. Therefore any values plotted above the zero base line would indicate an increase in corrected air flow from that which occurs at combustion exit temperatures of 3200° F. and any values plotted below that base line would indicated a decrease in such corrected air flow. The corrected air flow for the five locations noted above in the engine of the present invention is indicated in the graph of FIG. 8A, and the corrected air flow for these same five locations in the comparable variable area turbine engine is indicated in FIG. 8B.

Figure 8A:
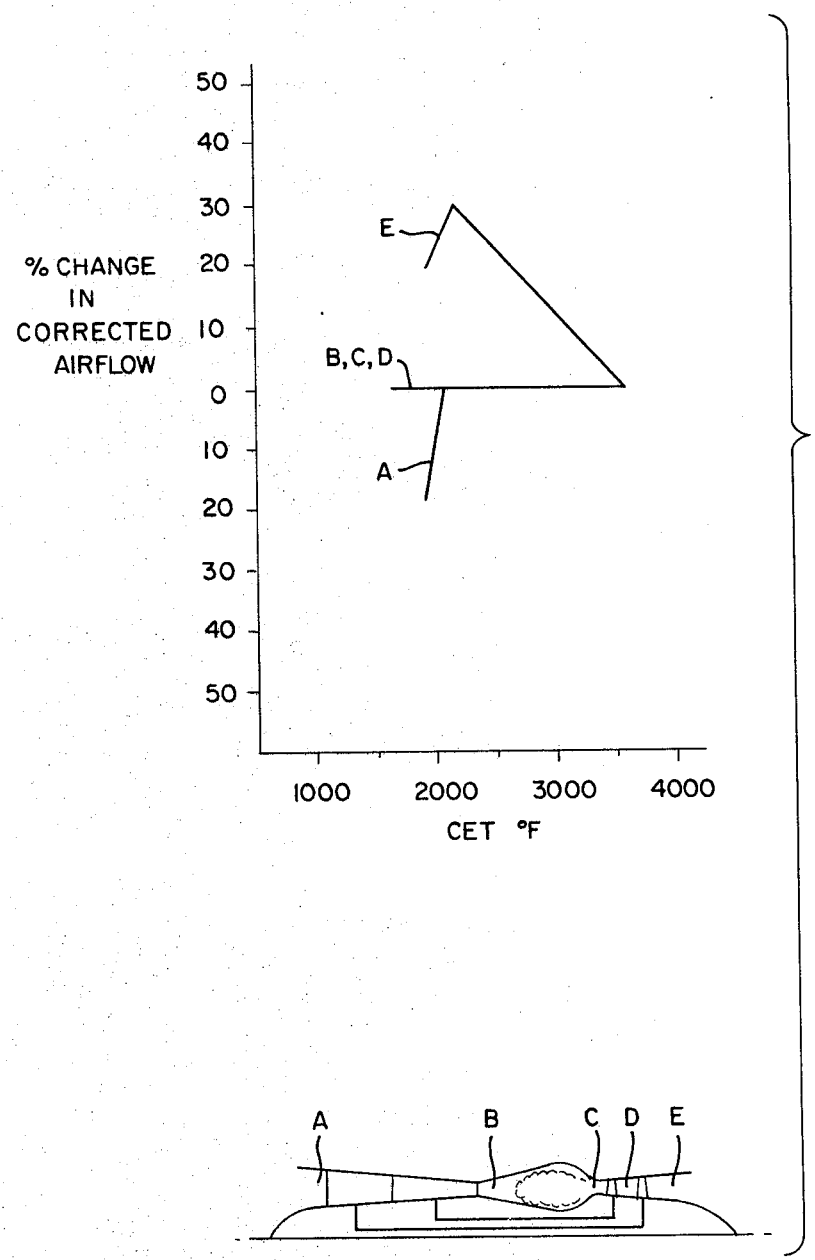
FIGS. 8A and 8B are graphic illustrations of, respectively, operating characteristics of the present invention and of a variable area turbine engine.
Figure 8B:
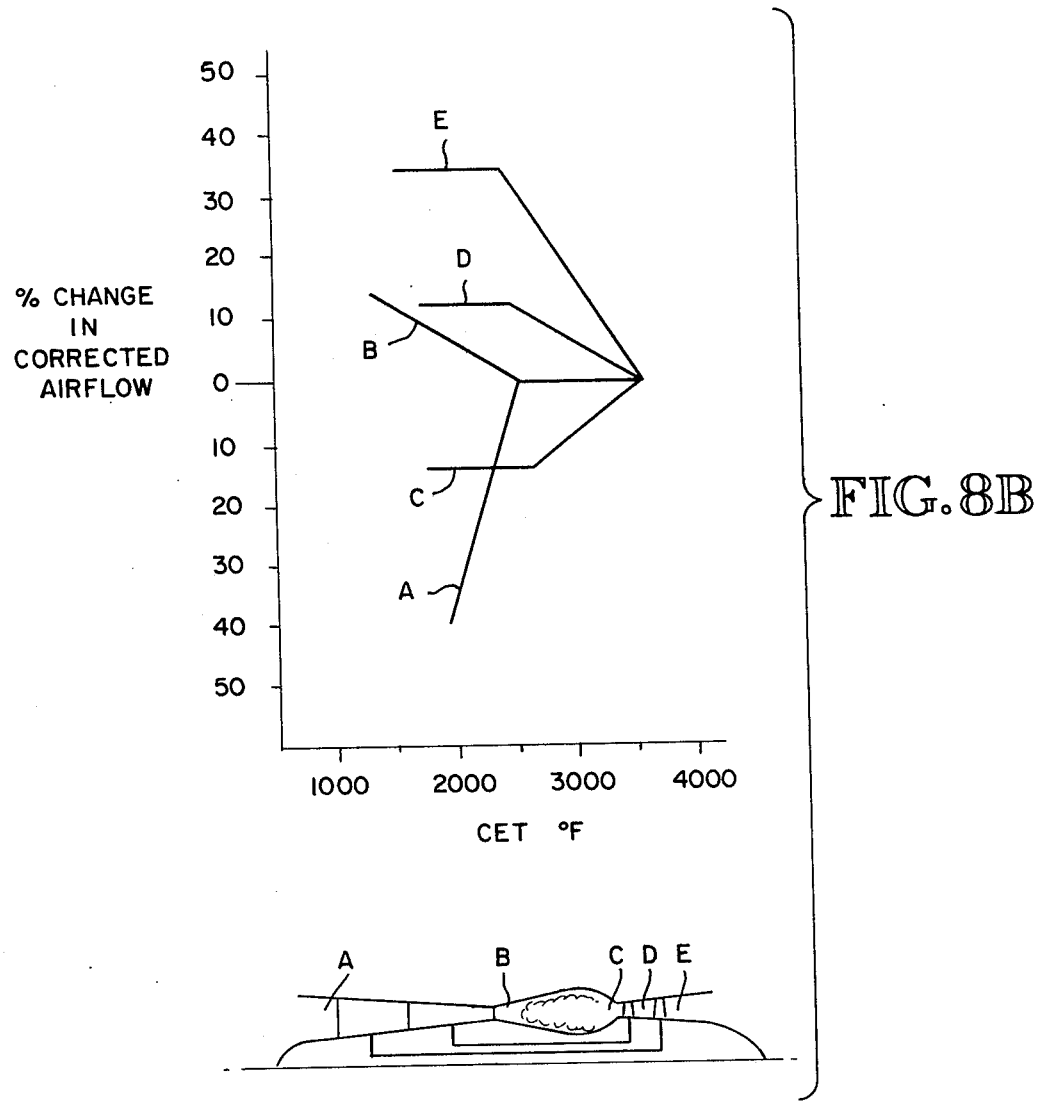

Let us first turn our attention to the operating characteristic of the engine of the present invention, as shown in FIG. 8A. First, at very low combustion exit temperatures (e.g., below 1650° F.) the correct air flow at the face of the compressor, indicated at "A", decreases. However, at combustion exit temperatures of 1650° F. and higher, the corrected flow into the compressor remains substantially constant, which indicates maximum compression ratio and best overall engine performance are obtained.

Also, in the engine of the present invention, it can be seen that throughout the entire range of combustion exit temperatures, the corrected air flow remains substantially constant at a location immediately downstream of the compressor (indicated at "B"), at the face of the turbine first stage (indicated at "C"), and at the location between the two turbine stages (indicated at "D"). Thus, through a relatively wide range of power setting, both the compressor and the turbine are operating under substantially constant operating conditions with respect to corrected air flow.

To turn our attention now to the operating characteristics of the variable area turbine engine, it can be seen that at the lower combustion exit temperatures, there is substantially lower airflow at the inlet than there is with the engine of the present invention. Also, at lower combustion exit temperatures, the corrected air flow at the face of the turbine first stage (indicated at "C") is lower than at the higher combustion exit temperatures, and the corrected airflow at the face of the turbine second stage is relatively high compared with the operation at higher combustion exit temperatures. Thus, as indicated earlier herein, with the variable area turbine engine, operating at lower combustion exit temperatures the turbine first stage must be moved to a more closed position, while the turbine second stage must be moved to a more open position, and with higher combustion exit temperatures, the blades of the two turbine stages must be moved to opposite positions.

Also, it can be seen that with the variable area turbine engine, at low combustion exit temperatures, the corrected air flow immediately downstream of the compressor is somewhat higher than at higher combustion exit temperatures. This would indicate that the compression ratio of the compressor would be lower for the variable area turbine engine at low combustion exit temperatures. This, along with the fact that there is less mass flow into the compressor at low combustion exit temperatures for the variable area turbine engine, indicates that in the subsonic cruise range, where combustion exit temperatures may be as low as 1650° F., the variable area turbine engine is not able to operate with the same cruise efficiency as the engine of the present invention. The design point efficiency of the variable area turbine is also lower, causing further reduction in cruise efficiency. Then the extreme position of the variable area turbine also causes further reduction in turbine efficiency and cruise efficiency.

What is claimed is:

1. A supersonic jet engine adapted to cruise at supersonic speeds at a relatively high efficiency, to operate with turbine inlet temperatures of at least 2500° F. for high power operation, and to cruise subsonically with a relatively low specific fuel consumption, said engine comprising:

a. a housing structure having an upstream inlet end to receive intake air, and a downstream exhaust end to discharge jet exhaust,
b. an air inlet arranged to receive intake air at subsonic velocity and also to receive intake air at supersonic velocities and reduce said air to subsonic velocity,
c. a compressor mounted in said housing rearwardly of said inlet and arranged to compress air flowing into said inlet, said compressor having an inlet end and an outlet end arranged to operate between a maximum compression ratio and a minimum compression ratio,
d. means defining a combustion chamber mounted in said housing downstream of said compressor to receive compressed air therefrom,
e. fuel injection and ignition means in said combustion chamber arranged to burn fuel in air flow from the compressor and provide a gaseous flow from said combustion chamber,
f. a turbine mounted in said housing rearwardly of said combustion chamber and arranged to receive said gaseous flow from the combustion chamber at temperatures at least as high as 2500° F. and also at lower temperatures, said turbine being operatively connected to said compressor to drive said compressor, said turbine having a predetermined cross-sectional nozzle area through which said gaseous flow passes to pass rearwardly through a primary exhaust passageway,
g. a variable area exhaust nozzle to receive gaseous flow from said turbine and exhaust said flow to produce a thrust,
h. turbine bypass means to receive flow from a location downstream of said compressor as bypass flow, and to direct said bypass flow along a path bypassing said turbine, and exhaust said bypass flow from said engine to produce a thrust,
i. bypass valve means to control the amount of flow bypassed into said turbine bypass means,
j. engine control means operatively connected to said fuel injection and ignition means, to said bypass valve means and to said exhaust nozzle, in a manner to control the amount of fuel directed to said fuel injection and ignition means, to control said bypass valve means in a manner to control the amount of bypass flow through said turbine bypass means, and to control the discharge area through said exhaust nozzle,
k. said turbine being matched to said compressor in a manner that with said engine operating at subsonic cruise velocity, with said compressor operating at maximum compression ratio, with said bypass valve means positioned so that there is substantially no flow through said turbine bypass means, and with fuel flow being adequate to create thrust to match airplane drag at said subsonic cruise velocity, the turbine has a flow area sized to allow gaseous flow therethrough at the speed of sound in said gaseous flow,
l. said engine control means being arranged to set said bypass valve means at a more open position at higher engine thrust settings where higher temperatures are created in said combustion chamber, and to set said bypass valve means at a more closed position at lower engine thrust settings where lower temperatures are created in said combustion chamber, in a manner that there is substantially constant corrected gaseous flow into said turbine, said corrected flow being measured according to the formula:

$$(W\sqrt{\theta+}/\delta+) = \text{corrected flow}$$

where:
W = Total mass flow rate in lbs. per second
$\theta+$ = Observed temperature (absolute) divider by standard temperature (518.67° R)
$\delta+$ = Observed pressure divided by standard pressure (2116.22 lbs./sq. ft.)

whereby during subsonic cruise said engine can operate at a relatively low specific fuel consumption with high compression ratio and low combustion exit temperature, in a condition where said valve bypass means is at a substantially closed position, during high power acceleration mode said engine can operate at high combustion exit temperatures in a condition where said valve bypass means is in a more open position to maintain constant corrected flow through said turbine to satisfy the turbine requirements, and during supersonic cruise mode the engine can operate efficiency at relatively high combustion exit temperatures.

2. The engine as recited in claim 1, wherein the nozzle area of the turbine is sized to correspond approximately to the value derived from the following formula, where the engine is operating at subsonic cruise and said bypass valve means is closed, said formula being:

$$(W\sqrt{\theta+}/\delta+) = \text{nozzle area}$$

where:
W = Total mass flow rate in lbs. per second
$\theta+$ = Observed temperature (absolute) divider by standard temperature (518.67° R)
$\delta+$ = Observed pressure divided by standard pressure (2116.22 lbs./sq. ft.)

3. The engine as recited in claim 1, wherein said turbine bypass means comprises passageway means positioned radially outwardly of said turbine and arranged to discharge bypass flow in a coannular pattern with respect to gaseous discharge from said turbine.

4. The engine as recited in claim 3, comprising variable area nozzle means located at a downstream end of said bypass passageway means and arranged to control flow in said bypass passageway means.

5. The engine as recited in claim 4, wherein said turbine bypass means comprises bypass inlet means located immediately downstream of said compressor, said bypass inlet means arranged to direct a selected portion of air from said compressor into said turbine bypass means.

6. The engine as recited in claim 1, wherein said turbine bypass means comprises a bypass inlet means located immediately downstream of said compressor, said bypass inlet means arranged to direct a selected portion of air from said compressor into said turbine bypass means.

7. The engine as recited in claim 1, wherein said compressor comprises a two-section compressor having a first low-pressure section and a second high-pressure section, and said turbine comprises a two-section turbine, made up of a first section and a second section, said turbine first section being operatively connected to said compressor second section, and said turbine second section being operatively connected to said compressor first section.

8. The engine as recited in claim 1, wherein said turbine bypass means comprises passageway means having an inlet end located downstream of said combustion chamber to receive gaseous flow from said combustion chamber.

9. The engine as recited in claim 8, wherein said valve means is located at a position adjacent the inlet end of said turbine bypass means.

10. The engine as recited in claim 1, further comprising an afterburner located downstream of said turbine and arranged to receive gaseous flow from said turbine and ignite fuel therein, said turbine bypass means being arranged to receive flow of air from a location immediately downstream of said compressor and to direct at least a portion of said air flow in an annular pattern around said afterburner means to provide cooling thereof.

11. The engine as recited in claim 1, wherein said turbine bypass means has a bypass outlet leading into said primary exhaust passageway, whereby gaseous flow through said turbine bypass means is discharged into the gaseous flow passing through said primary exhaust passageway.

12. The engine as recited in claim 1, wherein said turbine bypass means comprises a bypass inlet located immediately downstream of said compressor so as to direct a selected portion of air from said compressor into said turbine bypass means, and further comprising a bypass outlet means leading into said primary exhaust passageway and arranged to direct compressed air flowing through the turbine bypass means into the gaseous flow passing through said primary exhaust passageway.

13. The engine as recited in claim 1, wherein said turbine bypass means comprises a plurality of generally longitudinally extending tubes arranged circumferentially around said turbine.

14. The engine as recited in claim 13, wherein said turbine bypass means comprises a bypass inlet means located immediately downstream of said compressor so as to direct a selected portion of air from said compressor into said turbine bypass means, and further comprising a bypass outlet means leading into said primary exhaust passageway and arranged to direct compressed air flowing through the turbine bypass means into the gaseous flow passing through said primary exhaust passageway.

15. The engine as recited in claim 14, wherein said bypass valve means is located at said bypass outlet means.

16. A supersonic jet engine adapted to cruise at supersonic speeds at a relatively high efficiency, to operate with turbine inlet temperatures of at least 2500° F. for high power operation, and to cruise subsonically with a relatively low specific fuel consumption, said engine comprising:
   a. a housing structure having an upstream inlet end to receive intake air, and a downstream exhaust end to discharge jet exhaust,
   b. an air inlet arranged to receive intake air at subsonic velocity and also to receive intake air at supersonic velocities and reduce said air to subsonic velocity,
   c. a compressor mounted in said housing rearwardly of said inlet and arranged to compress air flowing into said inlet, said compressor having an inlet end and an outlet end arranged to operate between a maximum compression ratio and a minimum compression ratio,
   d. means defining a combustion chamber mounted in said housing downstream of said compressor to receive compressed air therefrom,
   e. fuel injection and ignition means in said combustion chamber arranged to burn fuel in air flow from said combustion chamber,
   f. a turbine mounted in said housing downwardly of said combustion chamber and arranged to receive said gaseous flow from the combustion chamber at temperatures at least as high as 2500° F. and also at lower temperatures, said turbine being operatively connected to said compressor to drive said compressor, said turbine having a predetermined cross-sectional nozzle area through which said gaseous flow passes to pass outwardly through a primary exhaust passageway,
   g. a variable area exhaust nozzle to receive gaseous flow from said turbine and exhaust said flow to produce a thrust,
   h. turbine bypass means to receive flow from a location downstream of said compressor as bypass flow, and to direct said bypass flow along a path bypassing said turbine, and exhaust said bypass flow from said engine to produce a thrust, said turbine bypass means comprises a plurity of generally longitudinally extending tubes arranged circumferentially around said turbine, said tubes having inlet means located immediately downstream of such compressor so as to receive air from said compressor, and also comprising outlets means leading into said primary exhaust passageway so as to direct the bypass flow in said turbine bypass means into said primary exhaust passageway,
   i. bypass valve means to control the amount of flow bypassed into said turbine bypass means,
   j. engine control means operatively connected to said fuel injection and ignition means, to said bypass valve means and to said exhaust nozzle, in a manner to control the amount of fuel directed to said fuel injection and ignition means to control said bypass valve means in a manner to control the amount of bypass flow through said exhaust nozzle,
   k. said turbine being matched to said compressor in a manner that with said engine operating at subsonic cruise velocity, with said compressor operating at maximum compression ratio, with said bypass valve means positioned so that there is substantially no flow through said turbine bypass means, and with fuel flow being adequate to create thrust to match airplane drag at said subsonic cruise velocity, the turbine has a flow area sized to allow gaseous flow therethrough at the speed of sound in said gaseous flow,
   l. said engine control means being arranged to set said bypass valve means at a more open position at higher engine thrust settings where higher temperatures are created in said combustion chamber, and to set said bypass valve means at a more closed position at lower engine thrust settings where lower temperatures are created in said combination chamber, in a manner that there is substantially constant corrected gaseous flow into said turbine, said corrected flow being measured according to the formula:

$$(W\sqrt{\theta+}/\delta+) = \text{corrected flow}$$

where:
   W = Total mass flow rate in lbs. per second
   $\theta+$ = Observed temperature (absolute) divider by standard temperature (518.67° R)
   $\delta+$ = Observed pressure divided by standard pressure (2116.22 lbs./sq. ft.)

whereby during subsonic cruise said engine can operate at a relatively low specific fuel consumption with high compression ratio and low combustion exit temperature, in a condition where said valve bypass means is at a substantially closed position, during high power acceleration mode said engine can operate at high combustion exit temperatures in a condition where said valve bypass means is in a more open position to satisfy the turbine requirements, and during supersonic cruise mode the engine can operate efficiently at relatively high combustion exit temperatures.

17. A supersonic jet engine adapted to cruise at supersonic speeds at a relatively high efficiency, to operate with turbine inlet temperatures of at least 2500° F. for high power operation, and to cruise subsonically with a relatively low specific fuel consumption, said engine comprising:

a. a housing structure having an upstream inlet end to receive intake air, and a downstream exhaust end to discharge jet exhaust, b. an air inlet arranged to receive intake air at subsonic velocity and also to receive intake air at supersonic velocities and reduce said air to subsonic velocity, c. a compressor mounted in said housing rearwardly of said inlet and arranged to compress air flowing into said inlet, said compressor having an inlet end and an outlet end arranged to operate between a maximum compression ratio and a minimum compression ratio, d. means defining a combustion chamber mounted in said housing downstream of said compressor to receive compressed air therefrom, e. fuel injection and ignition means in said combustion chamber arranged to burn fuel in air flow from the compressor and provide a gaseous flow from said combustion chamber, f. a turbine mounted in said housing downwardly of said combustion chamber and arranged to receive said gaseous flow from the combustion chamber at temperatures at least as high as 2500° F. and also at lower temperatures, said turbine being operatively connected to said compressor to drive said compressor, said turbine having a predetermined cross-sectional nozzle area through which said gaseous flow passes to pass outwardly through a primary exhaust passageway, g. an exhaust nozzle to receive gaseous flow from said turbine and exhaust said flow to produce a thrust, h. turbine bypass means to receive flow from a location downstream of said compressor as bypass flow, and to direct said bypass flow along a path bypassing said turbine, and exhaust said bypass flow from said engine to produce a thrust, i. bypass valve means to control the amount of flow bypassed into said turbine bypass means, j. engine control means operatively connected to said fuel injection and ignition means and to said bypass valve means in a manner to control the amount of fuel directed to said fuel injection and ignition means and to control said bypass valve means in a manner to control the amount of bypass flow through said turbine bypass means, k. said turbine being matched to said compressor in a manner that with said engine operating at subsonic cruise velocity, with said compressor operating at maximum compression ratio, with said bypass valve means positioned so that there is substantially no flow through said turbine bypass means, and with fuel flow being adequate to create thrust to match airplane drag at said subsonic cruise velocity, the turbine has a flow area sized to allow gaseous flow therethrough at the speed of sound in said gaseous flow, l. said engine control means being arranged to set said bypass valve means at a more open position at higher engine thrust settings where higher temperatures are created in said combustion chamber, and to set said bypass valve means at a more closed position at lower engine thrust settings where lower temperatures are created in said combustion chamber, in a manner that there is substantially constant corrected gaseous flow into said turbine, said corrected flow being measured according to the formula:

$$(W\sqrt{\theta+}/\delta+) = \text{corrected flow}$$

where:
W = Total mass flow rate in lbs. per second
$\theta+$ = Observed temperature (absolute) divider by standard temperature (518.67° R)
$\delta+$ = Observed pressure divided by standard pressure (2116.22 lbs./sq. ft.)

whereby during subsonic cruise said engine can operate at a relatively low specific fuel consumption with high compression ratio and low combustion exit temperature, in a condition where said valve bypass means is at a substantially closed position, during high power acceleration mode said engine can operate at high combustion exit temperatures in a condition where said valve bypass means is in a more open position to maintain constant corrected flow through said turbine to satisfy the turbine requirements, and during supersonic cruise mode the engine can operate efficiently at relatively high combustion exit temperatures.

18. In a supersonic jet engine adapted to cruise supersonic speeds at a relatively high efficiency, to operate with turbine inlet temperatures of at least 2500° F. for high power operation, and to cruise subsonically with a relatively low specific fuel consumption, said engine comprising:

a. a housing structure having an upstream inlet end to receive intake air, and a downstream exhaust end to discharge jet exhaust, b. an air inlet arranged to receive intake air at subsonic velocity and also to receive intake air at supersonic velocities and reduce said air to subsonic velocity, c. a compressor mounted in said housing rearwardly of said inlet and arranged to compress air flowing into said inlet, said compressor having an inlet end and an outlet end arranged to operate between a maximum compression ratio and a minimum compression ratio, d. means defining a combustion chamber mounted in said housing downstream of said compressor to receive compressed air therefrom, e. fuel injection and ignition means in said combustion chamber arranged to burn fuel in air flow from the compressor and provide a gaseous flow from said combustion chamber, f. a turbine mounted in said housing downwardly of said combustion chamber and arranged to receive said gaseous flow from the combustion chamber at temperatures at least as high as 2500° F. and also at lower temperatures, said turbine being operatively connected to said compressor to drive said compressor, said turbine having a predetermined cross-sectional nozzle area through which said gaseous flow passes to pass outwardly through a primary exhaust passageway g. a variable area exhaust nozzle to receive gaseous flow from said turbine and exhaust said flow to produce a thrust, h. turbine bypass means to receive flow from a location downstream of said compressor as bypass flow, and to direct said bypass flow along a path bypassing said turbine, and exhaust said bypass flow from said engine to produce a thrust, i. bypass valve means to control the amount of flow bypassed into said turbine bypass means, j. said turbine being matched to said compressor in a manner that with said engine operating at subsonic cruise velocity, with said compressor operating at maximum compression ratio, with said bypass valve means positioned so that there is substantially no flow through said turbine bypass means, and with fuel flow being adequate to create thrust to match airplane drag at said subsonic cruise velocity, the turbine has a flow area sized to allow gaseous flow therethrough at the speed of sound in said gaseous flow, a method of operating said jet engine, said method comprising: controlling the amount of fuel directed to said fuel injection and ignition means and controlling said bypass valve means in a manner to control the amount of bypass flow through said turbine bypass means so that said bypass valve means is at a more open position at higher engine thrust settings where higher temperatures are created in said combustion chamber, and at a more closed position at lower engine thrust settings where lower temperatures are created in said combustion chamber, in a manner that there is substantially constant corrected gaseous flow into said turbine, said corrected flow being measured according to the formula:

$$(W\sqrt{\theta+}/\delta+) = \text{corrected flow}$$

where:
W = Total mass flow rate in lbs. per second
$\theta+$ = Observed temperature (absolute) divider by standard temperature (518.67° R)
$\delta+$ = Observed pressure divided by standard pressure (2116.22 lbs./sq. ft.)

whereby during subsonic cruise said engine can operate at a relatively low specific fuel consumption with high compression ratio and low combustion exit temperature, in a condition where said valve bypass means is at a substantially closed position, during high power acceleration mode, said engine can operate at high combustion exit temperatures in a condition where said valve bypass means is in a more open position to maintain constant corrected flow through said turbine to satisfy the turbine requirements, and during supersonic cruise mode the engine can operate efficiently at relatively high combustion exit temperatures.

19. The method as recited in claim 18, further comprising directing said bypass flow radially outwardly of said turbine and discharging said bypass flow in a coannular pattern with respect to gaseous discharge from said turbine.

20. The method as recited in claim 19, further comprising utilizing variable area nozzle means at a downstream end of said turbine bypass means to control flow through said turbine bypass means.

21. The method as recited in claim 20, further comprising directing air from a location immediately downstream of said compressor into said turbine bypass means.

22. The method as recited in claim 18 further comprising directing air from a location immediately downsteam of said compressor into said turbine bypass means.

23. The method as recited in claim 18, wherein said compressor comprises a two section compressor having a first low pressure section and a second high pressure section, and said turbine comprises a two section turbine made up of a first section and a second section, said turbine first section being operatively connected to said compressor second section, and said turbine second section being operatively connected to said compressor first section.

24. The method as recited in claim 18, further comprising directing gaseous flow into said turbine bypass means from a location downstream of said combustion chamber.

25. The method as recited in claim 24, further comprising controlling flow through said turbine bypass means by means of said valve means at a location adjacent the inlet of said turbine bypass means.

26. The method as recited in claim 18, further comprising injecting fuel into said engine at a location downstream of said turbine, and directing bypass flow passing through said turbine bypass means in an annular pattern around said main exhaust passageway to provide cooling.

27. The method as recited in claim 18, further comprising directing bypass flow in said turbine bypass means into said primary exhaust passageway.

28. The method as recited in claim 18, further comprising directing air from a location immediately downstream of said compressor into said turbine bypass means, and directing bypass flow in said turbine bypass means into said primary exhaust passageway.

29. The method as recited in claim 28, further comprising directing bypass flow through a plurality of generally longitudinally extending tubes arranged circumferentially around said turbine.

30. The method as recited in claim 18, further comprising directing bypass flow through a plurality of generally longitudinally extending tubes arranged circumferentially around said turbine.

* * * * *